US008458778B2

(12) United States Patent
Budampati et al.

(10) Patent No.: US 8,458,778 B2
(45) Date of Patent: Jun. 4, 2013

(54) SYSTEM, METHOD, AND APPARATUS FOR ON-DEMAND LIMITED SECURITY CREDENTIALS IN WIRELESS AND OTHER COMMUNICATION NETWORKS

(75) Inventors: Ramakrishna S. Budampati, Maple Grove, MN (US); Denis Foo Kune, Saint Paul, MN (US); Soumitri N. Kolavennu, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1228 days.

(21) Appl. No.: 12/020,093

(22) Filed: Jan. 25, 2008

(65) Prior Publication Data

US 2009/0064295 A1    Mar. 5, 2009

Related U.S. Application Data

(60) Provisional application No. 60/967,342, filed on Sep. 4, 2007.

(51) Int. Cl.
*G06F 7/04* (2006.01)

(52) U.S. Cl.
USPC ...... 726/6; 726/18; 726/19; 726/25; 713/161; 713/165; 380/30; 455/556.1

(58) Field of Classification Search
USPC ............... 726/27, 28, 4–6; 713/168–170
See application file for complete search history.

(56) References Cited

U.S. PATENT DOCUMENTS

| | | | | |
|---|---|---|---|---|
| 6,441,747 B1 * | 8/2002 | Khair et al. | ............... | 340/870.16 |
| 7,224,713 B2 * | 5/2007 | Partyka | ......................... | 375/135 |
| 7,314,169 B1 * | 1/2008 | Jasper et al. | .................. | 235/382 |
| 7,530,113 B2 * | 5/2009 | Braun | .............................. | 726/28 |
| 7,890,136 B1 * | 2/2011 | Fujisaki | .................... | 455/556.1 |
| 8,205,085 B2 * | 6/2012 | Yao | ............................... | 713/171 |
| 2002/0155832 A1 * | 10/2002 | Stucky et al. | ................. | 455/426 |
| 2003/0032407 A1 * | 2/2003 | Mages | ........................... | 455/411 |
| 2004/0107345 A1 * | 6/2004 | Brandt et al. | ................. | 713/171 |
| 2005/0154911 A1 * | 7/2005 | Schneider | ...................... | 713/200 |
| 2005/0201349 A1 | 9/2005 | Budampati | | |
| 2005/0281215 A1 | 12/2005 | Budampati et al. | | |
| 2006/0002368 A1 | 1/2006 | Budampati et al. | | |

(Continued)

FOREIGN PATENT DOCUMENTS

| EP | 1 610 199 A1 | 12/2005 |
|---|---|---|
| WO | WO 2005/116841 A1 | 12/2005 |

OTHER PUBLICATIONS

Rahman M, Secure Time Synchronization for Wireless Sensor Networks Based on Bilinear Pairing Functions, May 2010, Issue 99, pp. 2-3, 11-13.*

(Continued)

*Primary Examiner* — Nathan Flynn
*Assistant Examiner* — Viral Lakhia

(57) ABSTRACT

A method includes storing a security credential associated with a communication network on a portable storage device. The method also includes detecting removal of the portable storage device from a specified location. The method further includes allowing at least one communication device to communicate over the communication network using the security credential. In addition, the method includes revoking the security credential after a specified time period has elapsed. The portable storage device could represent a card, and the specified location could represent a card reader/writer. Also, the communication network could represent a wireless network, and the security credential could represent a cryptographic key.

20 Claims, 5 Drawing Sheets

U.S. PATENT DOCUMENTS

| | | | |
|---|---|---|---|
| 2006/0026672 A1* | 2/2006 | Braun | 726/9 |
| 2006/0171344 A1 | 8/2006 | Subramanian et al. | |
| 2006/0171346 A1 | 8/2006 | Kolavennu et al. | |
| 2006/0227729 A1 | 10/2006 | Budampati et al. | |
| 2006/0274644 A1 | 12/2006 | Budampati et al. | |
| 2006/0274671 A1 | 12/2006 | Budampati et al. | |
| 2006/0287001 A1 | 12/2006 | Budampati et al. | |
| 2007/0030816 A1 | 2/2007 | Kolavennu | |
| 2007/0030832 A1 | 2/2007 | Gonia et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0136596 A1* | 6/2007 | Adiletta et al. | 713/176 |
| 2007/0136814 A1* | 6/2007 | Lee et al. | 726/25 |
| 2007/0155423 A1 | 7/2007 | Carmody et al. | |
| 2007/0162960 A1* | 7/2007 | Takahashi | 726/4 |
| 2007/0248232 A1* | 10/2007 | Driscoll et al. | 380/280 |
| 2008/0016558 A1* | 1/2008 | Aull et al. | 726/9 |
| 2008/0086770 A1* | 4/2008 | Kulkarni et al. | 726/20 |
| 2008/0089255 A1* | 4/2008 | Graves et al. | 370/310 |
| 2008/0263647 A1* | 10/2008 | Barnett et al. | 726/6 |
| 2009/0222671 A1* | 9/2009 | Burbank et al. | 713/186 |

OTHER PUBLICATIONS

Communication pursuant to Article 94(3) EPC dated Jul. 16, 2009 in connection with European Patent Application No. 08 163 538.5.

Thomas L. Phinney, "Apparatus and Method for Acknowledging Successful Transmissions in a Wireless Communication System," U.S. Appl. No. 11/799,171, filed May 1, 2007.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

Ramakrishna S. Budampati, et al., "System and Method for Providing Simultaneous Connectivity Between Devices in an Industrial Control and Automation or Other System", U.S. Appl. No. 11/981,212, filed Oct. 30, 2007.

Frederick Hidle, "System and Method for Providing Secure Network Communications", U.S. Appl. No. 11/981,213, filed Oct. 30, 2007.

* cited by examiner

SYSTEM, METHOD, AND APPARATUS FOR ON-DEMAND LIMITED SECURITY CREDENTIALS IN WIRELESS AND OTHER COMMUNICATION NETWORKS

CROSS-REFERENCE TO RELATED APPLICATIONS

This application claims priority under 35 U.S.C. §119(e) to U.S. Provisional Patent Application No. 60/967,342 filed on Sep. 4, 2007, which is hereby incorporated by reference.

TECHNICAL FIELD

This disclosure relates generally to network security and more specifically to a system, method, and apparatus for on-demand limited security credentials in wireless and other communication networks.

BACKGROUND

Many buildings, facilities, and other structures include secure communication networks, which are used for wireless and other types of communications. For example, chemical plants and other industrial facilities often include wireless networks, which can be used for a wide variety of purposes. As particular examples, the wireless networks in industrial facilities could be used to transport data to and from process controllers, process sensors, and process actuators. These wireless networks could also facilitate wireless communications between personnel working in the industrial facilities.

In order to prevent malicious or other unauthorized intrusions into a wireless network, various forms of security are typically employed in the wireless network. Common security mechanisms include (among others) the use of encryption keys, challenge-response mechanisms, and Medium Access Control (MAC) filtering.

SUMMARY

This disclosure provides a system, method, and apparatus for on-demand limited security credentials in wireless and other communication networks.

In a first embodiment, a method includes storing a security credential associated with a communication network on a portable storage device. The method also includes detecting removal of the portable storage device from a specified location. The method further includes allowing at least one communication device to communicate over the communication network using the security credential. In addition, the method includes revoking the security credential after a specified time period has elapsed.

In particular embodiments, the portable storage device includes a card, and the specified location includes a card reader/writer.

In other particular embodiments, revoking the security credential includes revoking the security credential after a timer has expired.

In yet other particular embodiments, the method also includes determining whether additional time is needed. If so, the security credential is revoked after the specified time period and an additional amount of time have elapsed.

In still other particular embodiments, allowing the at least one communication device to communicate over the communication network includes authenticating the at least one communication device and/or authorizing the at least one communication device to communicate over the communication network. Authenticating the at least one communication device could include using a wireless node to communicate with the at least one communication device, where the wireless node is separate from the communication network.

In additional particular embodiments, the communication network includes a wireless network, and the security credential includes a cryptographic key.

In a second embodiment, a system includes a communication network and a trust center. The trust center is configured to store a security credential associated with the communication network on a portable storage device and to detect removal of the portable storage device from a specified location. The trust center is also configured to allow at least one communication device to communicate over the communication network using the security credential and to revoke the security credential after a specified time period has elapsed.

In a third embodiment, an apparatus includes an interface configured to provide access to a portable storage device. The apparatus also includes a security credentials controller configured to generate a security credential associated with a communication network, to store the security credential on the portable storage device, to detect removal of the portable storage device from a specified location, and to revoke the security credential after a specified time period has elapsed. In addition, the apparatus includes an authentication controller configured to allow at least one communication device to communicate over the communication network using the security credential when the security credential is valid.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
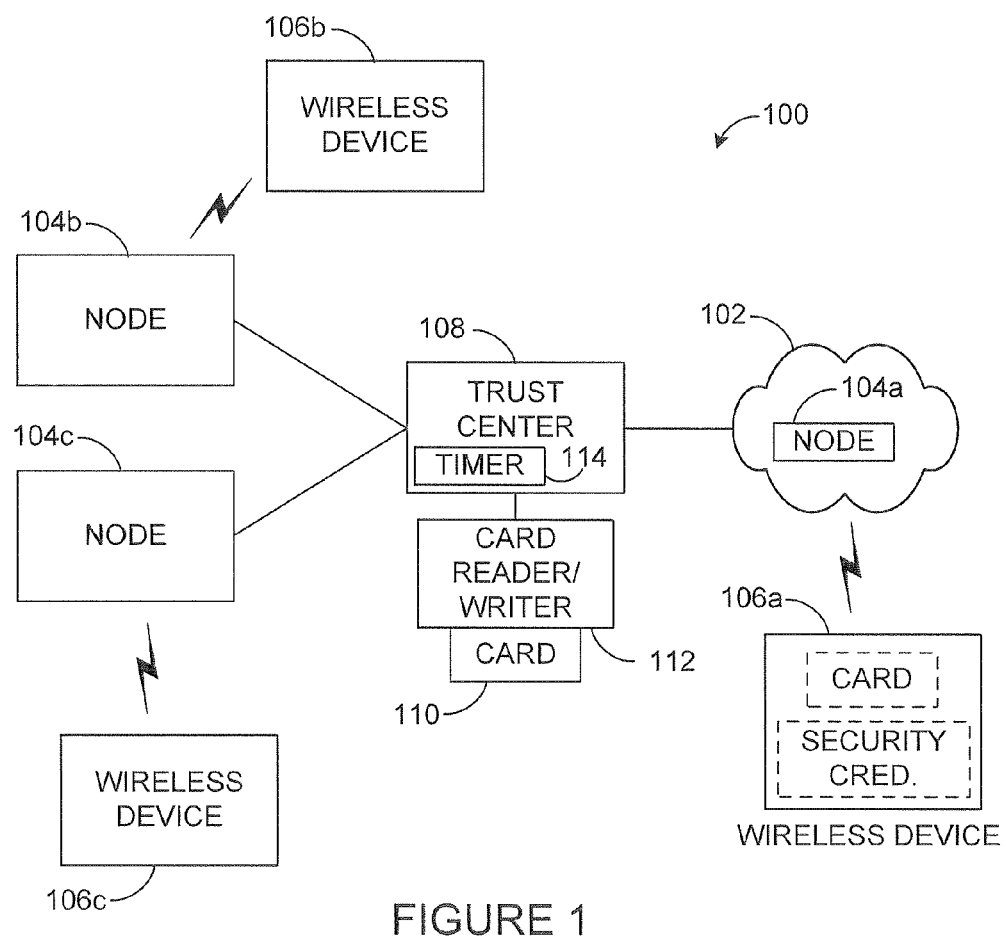
FIG. 1 illustrates an example communication system according to this disclosure.

FIG. 1 illustrates an example communication system 100 according to this disclosure. The embodiment of the communication system 100 shown in FIG. 1 is for illustration only. Other embodiments of the communication system 100 could be used without departing from the scope of this disclosure.

As shown in FIG. 1, the communication system 100 includes a wireless network 102. The wireless network 102 generally represents a network that allows various wireless devices, such as wireless device 106a, to communicate over a wireless communication medium. For example, the wireless network 102 could represent a network formed by one or more nodes 104a, which may communicate with wireless devices using radio frequency (RF) signals. Multiple nodes 104a may also communicate with one another, thereby allowing the nodes 104a to route information across the wireless network 102. Further, one or more of the nodes 104a could be coupled to a wired communication network, thereby facilitating communications between wired and wireless devices in the system 100. The wireless network 102 includes any suitable structure(s) facilitating wireless communications with one or more wireless devices. The wireless network 102 could also support any suitable communication technology, such as the IEEE 802.11a, 802.11b, 802.11g, 802.11n, 802.15.3, 802.15.4, or 802.16 protocol.

A trust center 108 is coupled to or included within the wireless network 102. The trust center 108 controls access to the wireless network 102 and secures links into the wireless network 102. For example, the trust center 108 may maintain security credentials for the wireless network 102 or other communication network. The trust center 108 may also ensure that any wireless devices attempting to access the wireless network 102 possesses the appropriate security credentials. For example, the trust center 108 could use Medium Access Control (MAC) address/public key pairing to ensure security. This means that the trust center 108 may ensure that communications from a particular device use the appropriate public key and that the device itself has the appropriate MAC address paired to that key. Wireless devices having the appropriate security credentials may be granted access to the wireless network 102, while wireless devices not having the appropriate security credentials are blocked from using the wireless network 102 (or have more limited use of the wireless network 102). The trust center 108 may take any other or additional actions to secure the wireless network 102. In this document, the phrase "security credential" refers to any information needed to access a secure communication network.

In an emergency or other situation, it is often desirable to give "first responders" (such as police, firefighters, and medical personnel) or other personnel access to a secured wireless network, such as the wireless network 102. This may be done for various reasons, such as to give the first responders or other personnel situational information. As a specific example, in a chemical plant, first responders or other personnel may need to know where toxic chemicals could be leaking. At the same time, it is typically desirable to provide a simple and intuitive way to distribute security credentials to the first responders or other personnel, which would allow them to quickly gain access to the wireless network 102.

In accordance with this disclosure, one or more physical cards or other portable storage devices can be used to distribute security credentials. For example, a card 110 could be in communication with the trust center 108 via a card reader/writer 112. The card reader/writer 112 could be within, coupled to, or otherwise associated with the trust center 108 in any suitable manner. The trust center 108 can store cryptographic credentials or other security-related credentials on the card 110. The card 110 could represent any suitable device for storing one or more security credentials, such as a Compact Flash card, Secure Digital card, Universal Serial Bus (USB) drive, or other portable storage medium. The card reader/writer 112 facilitates interaction between the trust center 108 and the card 110, allowing the trust center 108 to read data from and/or write data to the card 110. This may allow, for instance, the trust center 108 to verify that an authorized card 110 has been placed in the card reader/writer 112 and to write security credentials to the card 110. The card reader/writer 112 could represent any suitable device for providing an interface between the card 110 and the trust center 108, such as a Compact Flash card reader/writer, a Secure Digital card reader/writer, or a USB dock or cable.

In one aspect of operation, a card 110 can be inserted into the card reader/writer 112, and the trust center 108 can copy appropriate security credentials to the card 110. The security credentials on the card 110 could then be distributed to a single wireless device 106a or to a group of wireless devices 106a-106c. For example, a first responder group (such as a leader of the group) could physically receive the card 110 and plug the card 110 into the wireless device 106a of the group leader. The group leader's wireless device 106a could download and store the security credentials. The group leader's wireless device 106a could then distribute the security credentials to the other group members' wireless devices 106b-106c (such as via a secure channel). In other embodiments, the group leader could insert the card 110 into each group member's wireless device in turn, allowing each group member's wireless device to download the security credentials. Any other or additional techniques could be used to distribute the security credentials from the card 110 to the wireless devices 106a-106c. At this point, each wireless device 106a-106c can now authenticate itself to the trust center 108 and gain access to the wireless network 102. This may allow, for example, voice or data to be routed to and from the wireless devices 106a-106c using the wireless network 102.

A time policy can also be defined for security credentials to be distributed to first responders or other personnel via the card 110. For example, when a card 110 is inserted into the card reader/writer 112, the trust center 108 could immediately copy security credentials to the card 110, but a timer 114 associated with the security credentials may not be triggered or started yet. The trust center 108 can keep the security credentials on the card 110 secret and up-to-date. When first responders or other personnel arrive at a particular location and need access to the wireless network 102, an operator may remove the card 110 from the reader/writer 112 at the trust center 108. That action activates the timer 114 for the security credentials on the card 110. The timer 114 could be implemented by the trust center 108 or any other suitable device or system. The act of removing the card 110 from the reader/writer 112 in the trust center 108 (or other specified location) activates the timer 114, which is used to limit the time period during which the security credentials are valid.

At some point (such as after the card 110 is returned to the reader/writer 112 or the timer 114 expires), the security credentials from the card 110 may automatically expire or be revoked. The security credentials could also be revoked manually at any time, such as by an authorized user. When this occurs, the wireless devices 106a-106c that had received the security credentials on the card 110 may be prevented from accessing or using the wireless network 102. If necessary, the lifetime of the security credentials can be extended if the situation requires it, such as when the first responders are still dealing with an emergency. This extension could occur manually or automatically.

This technique thus provides a simple way to create a secure communication pipe between a first responder group or other personnel and a wireless network. As a result, various applications (such as emergency displays) may gain access to required or desired data using the wireless network. Moreover, the use of the timer 114 and the associated expiration of the security credentials may help to limit potential attacks using those security credentials after a crisis is over. It may be noted that the security credentials copied to a card 110 may or may not be valid before the card 110 is removed from the card reader/writer 112.

In the embodiment shown in FIG. 1, two nodes 104b-104c are shown residing outside of the wireless network 102. In some embodiments, these nodes 104b-104c could be used to facilitate communication between wireless devices and the trust center 108 without the wireless devices requiring access to the wireless network 102. This may allow, for example, the trust center 108 to communicate with and authenticate wireless devices that have received security credentials from the card 110, which can be done without allowing or requiring initial access to the wireless network 102. However, this is for illustration only and is not required in the system 100. In other embodiments, the security credentials provided on the card 110 may allow the wireless devices 106a-106c to immediately begin using the wireless network 102, and any authentication or other communications with the trust center 108 may occur over the wireless network 102. In general, a "wireless node" may represent any device that can transmit and/or receive data wirelessly (even if the "wireless node" has the ability to transmit and/or receive data over a wired connection, as well).

Although FIG. 1 illustrates one example of a communication system 100, various changes may be made to FIG. 1. For example, the system 100 may include any number of wireless networks, network nodes, trust centers, timers, credential cards, card readers/writers, and wireless devices. Also, the functional division shown in FIG. 1 is for illustration only. Various components in FIG. 1 could be combined, subdivided, or omitted and additional components could be added according to particular needs. In addition, FIG. 1 illustrates one operational environment in which time-limited security credentials can be distributed to communication devices. This functionality could be used in any suitable system and with any type of secure communication network (wired or wireless).

Figure 2:
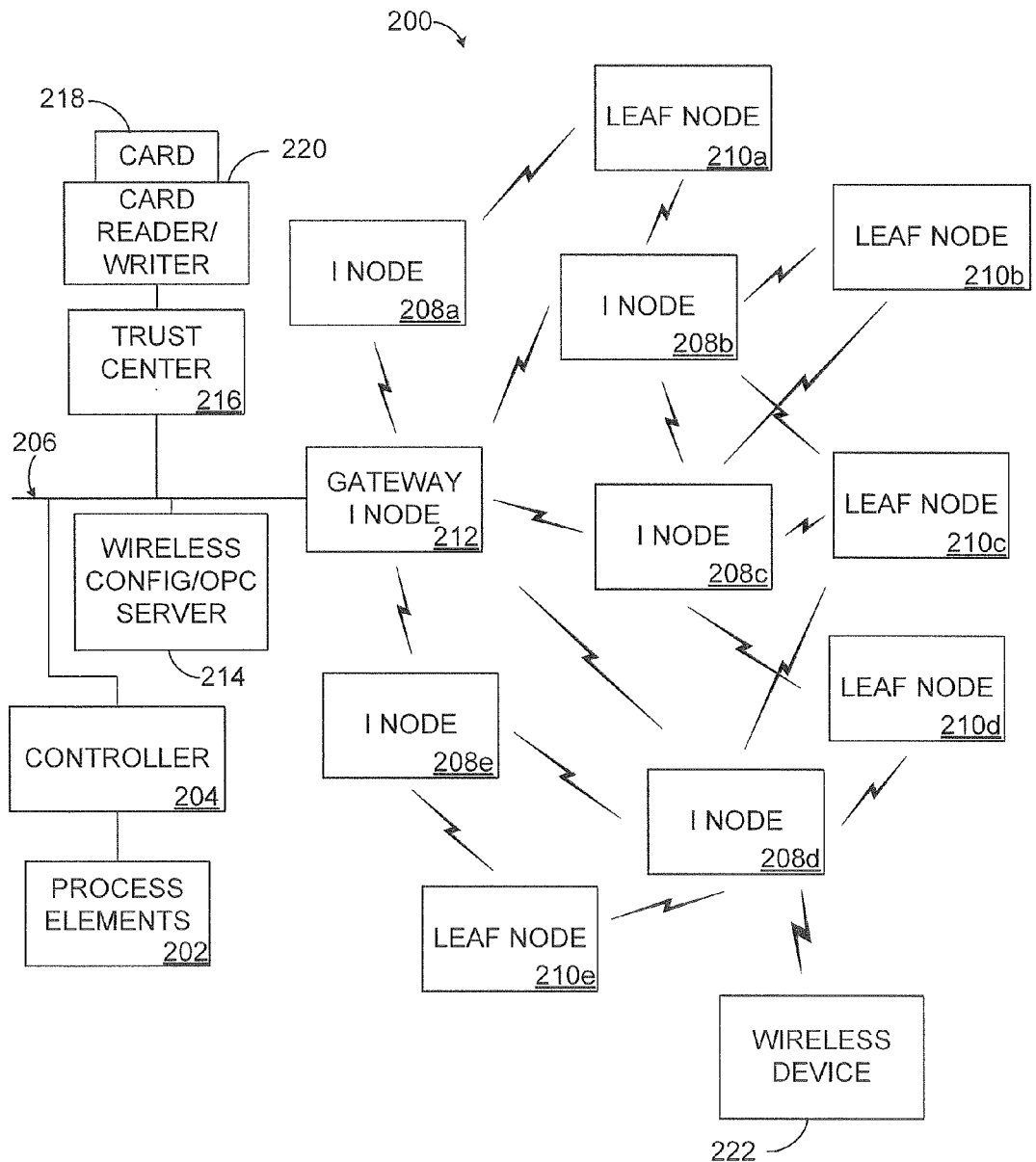
FIG. 2 illustrates an example industrial control and automation system according to this disclosure.

FIG. 2 illustrates an example industrial control and automation system 200 according to this disclosure. The embodiment of the industrial control and automation system 200 shown in FIG. 2 is for illustration only. Other embodiments of the industrial control and automation system 200 could be used without departing from the scope of this disclosure.

In this example embodiment, the industrial control and automation system 200 includes one or more process elements 202. The process elements 202 represent components in a process or production system that may perform any of a wide variety of functions. For example, the process elements 202 could represent sensors, actuators, or any other or additional industrial equipment in a processing environment. Each of the process elements 202 includes any suitable structure for performing one or more functions in a processing or production system. Also, the phrase "industrial control and automation system" generally refers to a system that automates and controls at least one process.

A controller 204 is coupled to the process elements 202. The controller 204 controls the operation of one or more of the process elements 202. For example, the controller 204 could receive information associated with the system 200, such as by receiving sensor measurements from some of the process elements 202. The controller 204 could use this information to provide control signals to others of the process elements 202, thereby adjusting the operation of those process elements 202. The controller 204 includes any hardware, software, firmware, or combination thereof for controlling one or more process elements 202. The controller 204 could, for example, represent a computing device executing a MICROSOFT WINDOWS operating system.

A network 206 facilitates communication between various components in the system 200. For example, the network 206 may communicate Internet Protocol (IP) packets, frame relay frames, Asynchronous Transfer Mode (ATM) cells, or other suitable information between network addresses. The network 206 may include one or more local area networks (LANs), metropolitan area networks (MANs), wide area networks (WANs), all or a portion of a global network such as the Internet, or any other communication system or systems at one or more locations.

As shown in FIG. 2, the industrial control and automation system 200 also includes one or more wireless networks for communicating with wireless sensors or other wireless devices. In this example, a wireless network (such as a mesh network) is formed using infrastructure nodes ("I nodes") 208a-208e, leaf nodes 210a-210e, and a gateway infrastructure node 212.

The infrastructure nodes 208a-208e and the leaf nodes 210a-210e engage in wireless communications with each other. For example, the infrastructure nodes 208a-208e may receive data transmitted over the network 206 (via the gateway infrastructure node 212) and wirelessly communicate the data to the leaf nodes 210a-210e. Similarly, the leaf nodes 210a-210e may wirelessly communicate data to the infrastructure nodes 208a-208e for forwarding to the network 206 (via the gateway infrastructure node 212). In addition, the infrastructure nodes 208a-208e may wirelessly exchange data with one another. In this way, the nodes 208a-208e and 210a-210e form a wireless network capable of providing wireless coverage to a specified area, such as in a large industrial complex.

In this example, the nodes 208a-208e and 210a-210e are divided into infrastructure nodes and leaf nodes. The infrastructure nodes 208a-208e typically represent line-powered devices, meaning these nodes receive operating power from an external source. As a result, these nodes 208a-208e are typically not limited in their operations since they need not minimize power consumption to increase the operational life of their internal power supplies. On the other hand, the leaf nodes 210a-210e typically represent battery-powered devices, meaning these nodes receive operating power from internal batteries or other power supplies. Because of this, these nodes 210a-210e are often more limited in their operations in order to help preserve the operational life of their internal power supplies.

Each of the nodes 208a-208e and 210a-210e includes any suitable structure facilitating wireless communications, such as an RF transceiver. Each of the nodes 208a-208e and 210a-210e could also include other functionality, such as functionality for generating or using data communicated over the wireless network. For example, the leaf nodes 210a-210e could represent wireless sensors in an industrial facility, where the sensors are used to measure various characteristics within the facility. These sensors could collect sensor readings and communicate the sensor readings to the controller 204 via the gateway infrastructure node 212. The leaf nodes 210a-210e could also represent actuators that can receive control signals from the controller 204 and adjust the operation of the industrial facility. In this way, the leaf nodes 210a-210e may include or operate in a similar manner as the process elements 202 that are physically connected to the controller 204. The leaf nodes 210a-210e could further represent handheld user devices (such as INTELATRAC devices from HONEYWELL INTERNATIONAL INC.), mobile stations, programmable logic controllers (PLCs), or any other or additional devices.

In particular embodiments, the leaf nodes 210a-210e can include 802.15.4-based low data-rate sensors and 802.11-based high data-rate devices, and the various nodes in FIG. 2 form a mesh network communicating at 2.4 GHz or 5.8 GHz. Also, in particular embodiments, data can be injected into the wireless mesh network through the infrastructure nodes, thus providing versatile, multifunctional, plant-wide coverage for wireless sensing, asset location tracking, personnel tracking, wireless communications, and any other or additional functionality as desired.

The gateway infrastructure node 212 communicates wirelessly with, transmits data to, and receives data from one or more infrastructure nodes 208a-208e and possibly one or more leaf nodes 210a-210e. The gateway infrastructure node 212 also converts data between the protocol(s) used by the network 206 and the protocol(s) used by the nodes 208a-208e and 210a-210e. For example, the gateway infrastructure node 212 could convert Ethernet-formatted data (transported over the network 206) into a wireless protocol format (such as an IEEE 802.21a, 802.21b, 802.21g, 802.21n, 802.25.3, 802.25.4, or 802.26 protocol format) used by the nodes 208a-208e and 210a-210e. The gateway infrastructure node 212 could also convert data received from one or more of the nodes 208a-208e and 210a-210e into Ethernet-formatted data for transmission over the network 206. In addition, the gateway infrastructure node 212 could support various functions, such as network creation and security, used to create and maintain a wireless network. The gateway infrastructure node 212 includes any suitable structure for facilitating communication between components or networks using different protocols.

In this example, a wireless configuration and OLE for Process Control (OPC) server 214 can be used to configure and control various aspects of the process control system 200. For example, the server 214 could be used to configure the operation of the infrastructure nodes 208a-208e and the gateway node 212. The server 214 could also be used to support security in the industrial control and automation system 200. For instance, the server 214 could distribute cryptographic keys or other security data to various components in the industrial control and automation system 200, such as to the nodes 208a-208e, 210a-210e, and 212. The server 214 includes any hardware, software, firmware, or combination thereof for configuring wireless networks and providing security information.

In addition, the industrial control and automation system 200 includes a trust center 216, which provides security credentials to at least one card 218 via at least one card reader/writer 220. Each card 218 represents any suitable portable storage device for storing at least one security credential for a wireless or other communication network. Each card reader/writer 220 represents any suitable interface between the trust center 216 and a card 218. The card 218 can be used to distribute at least one security credential to one or more wireless devices 222, which allows the wireless devices 222 to communicate using the wireless network in the industrial control and automation system 200. Among other things, this may facilitate communications with first responders or other personnel during an emergency, such as when hazardous material data is made available to first responders during a chemical leak or spill. Also, one or more timers can be implemented in or used by the trust center 216, where a timer identifies when security credentials on a card 218 are valid (although extensions are possible).

As a particular example, during an emergency, such as a chlorine gas release that could occur at a manufacturing plant, at a storage site (such as a water treatment facility), or during rail-based transport, first responders often require rapid and secure connection to a wireless sensor network to gain current situational awareness. This can be enabled by the trust center 216, which can detect the presence of the first responders' wireless devices 222 and authenticate or authorize those devices. Data can then be routed to the wireless devices 222, such as in a redundant fashion, to enable more up-to-date situational awareness by the first responders. In this way, the system 200 enables seamless bridging and inclusion of first responder devices and networks, allowing the first responders to utilize the infrastructure of the system 200 as a communication engine as well as to access relevant plant and process data to make informed decisions.

In particular embodiments, data routing in the system 200 can occur by predefining at least two best non-overlapping routes from each source to each destination in the system or wireless network, and data can be sent on these multiple routes at the same time. The destination may receive two or more copies of the same data messages, and useful information can be extracted from the copies. While sending multiple copies of the messages increases the communication bandwidth requirement, it may significantly increase system reliability by making it robust to any single point failure. Unlike homogeneous mesh networks, this approach can operate at a high data-rate (such as up to 54 Mbps) at the infrastructure level and a low data-rate (such as 250 Kbps) at the sensor level, so providing increased bandwidth at the infrastructure level is not a problem. Redundancy can also be achieved on the sensor level by transmitting data messages that are received by two or more infrastructure nodes.

In addition, user interaction and man-machine interfaces can be provided in the system 200. For example, a display builder could be implemented or used within the trust center 216 or the system 200 in general. This module may allow users to design interfaces for different unit operations in a plant or other facility. By combining, for example, the EXPERION PKS system from HONEYWELL INTERNATIONAL INC. with the security credential distribution system of FIG. 2, this may allow wireless sensors to be used as part of these displays. It may also provide a seamless mechanism to have these displays available to mobile workers in the field. Moreover, for homeland security or other purposes, merging the two systems provides a very convenient way for designing user-interface displays for first responders. In many cases, safety procedures and failure modes are plant-specific, and this architecture enables integration of plant-specific information, first responder networks, and communication mechanisms to allow first responders or other personnel to act quickly in an emergency or other situation with timely situational awareness and responsive actions.

Although FIG. 2 illustrates one example of an industrial control and automation system 200, various changes may be made to FIG. 2. For example, the industrial control and automation system 200 could include any number of process elements, controllers, networks (wired or wireless), infrastructure nodes (gateway or other), leaf nodes, trust centers, credential cards, and card readers/writers. Also, the functional division shown in FIG. 2 is for illustration only. Various components in FIG. 2 could be combined, subdivided, or omitted and additional components could be added according to particular needs. In addition, while described as supporting a wireless network, the industrial control and automation system 200 could support any number of wireless or wired networks, at least one of which can be secured using the trust center 216 and one or more cards 218.

Figure 3:
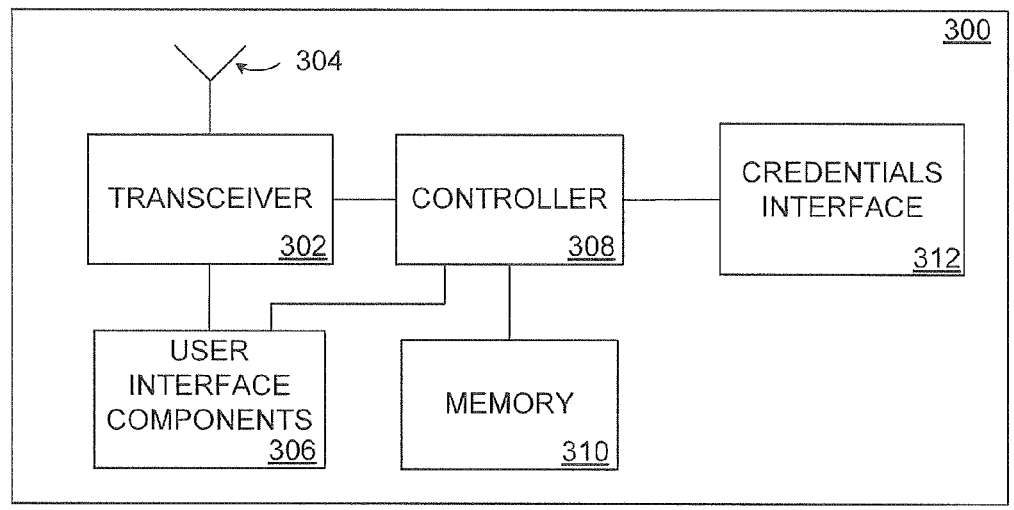
FIG. 3 illustrates an example wireless device in a communication system according to this disclosure.

FIG. 3 illustrates an example wireless device 300 in a communication system according to this disclosure. The wireless device 300 could, for example, represent the wireless devices 106a-106c in the communication system 100 of FIG. 1 or the wireless device 222 in the industrial control and automation system 200 of FIG. 2. The embodiment of the wireless device 300 shown in FIG. 3 is for illustration only. Other embodiments of the wireless device 300 could be used in the systems 100 and 200 or in other systems without departing from the scope of this disclosure.

As shown in FIG. 3, the wireless device 300 includes a transceiver 302 and an antenna 304. The transceiver 302 facilitates wireless communications to and from the wireless device 300. For example, the transceiver 302 could receive a baseband or intermediate signal and modulate the signal onto a carrier signal for transmission by the antenna 304. The transceiver 302 could also receive a carrier signal from the antenna 304 and down-convert the signal into a baseband or intermediate signal. The transceiver 302 could thereby facilitate communication between, for example, the wireless device 300 and one or more nodes (such as nodes 104a-104c, 208a-208e, 210a-210e, 212) in a wireless network or with other wireless devices. The transceiver 302 includes any suitable structure for transmitting and/or receiving wireless signals. In some embodiments, the transceiver 302 represents an RF transceiver, and the antenna 304 represents an RF antenna. The transceiver 302 could use any other suitable wireless signals to communicate. Also, the transceiver 302 could represent a transmitter and a separate receiver.

The wireless device 300 also includes various user interface components 306, which are used to interact with one or more users. For example, the user interface components 306 could include a speaker and a microphone, which can be used to respectively provide audio signals to and receive audio signals from a user. Among other things, this may allow the user to receive audible information or to engage in two-way conversations with others. The user interface components 306 may also include a keypad and a display for receiving data from and providing data to the user. The display could represent a touchscreen for receiving data from the user. The user interface components 306 could include any other or additional components.

The wireless device 300 further includes a controller 308. The controller 308 controls the overall operation of the device 300. For example, the controller 302 may receive or generate data to be transmitted externally, and the controller 308 could provide the data to the transceiver 302 for transmission. The controller 308 could also receive data from the transceiver 302 and use the data. As a particular example, the controller 308 could facilitate voice communications to and from a user of the device 300. The controller 308 could also present displays, sensor data, or other information to the user and receive requests for data or other information from the user. The controller 308 could further use security credentials to facilitate communications over a wireless or other communication network, such as by encrypting data appropriately or by providing expected responses to authentication challenges from a trust center. The controller 308 includes any suitable hardware, software, firmware, or combination thereof for controlling operation of the device 300. As particular examples, the controller 308 could represent a processor, microprocessor, microcontroller, field programmable gate array (FPGA), or other processing or control device.

A memory 310 is coupled to the controller 308. The memory 310 stores any of a wide variety of information used, collected, or generated by the device 300. For example, the memory 310 could store security credentials used to communicate over a wireless or other communication network. The memory 310 includes any suitable volatile and/or non-volatile storage and retrieval device or devices.

In addition, the wireless device 300 includes a security credentials interface 312. The security credentials interface 312 represents an interface to a card or other device that provides security credentials. The card or other device can be inserted into or otherwise communicatively coupled to the security credentials interface 312. This allows the controller 308 to retrieve the security credentials from the card or other device. At this point, the controller 308 could store the security credentials in the memory 310, communicate the security credentials to other wireless devices, or otherwise use the security credentials in any suitable manner. The security credentials interface 312 includes any suitable structure for interfacing the wireless device 300 and a card or other device that provides a security credential. It may be noted that some wireless devices may lack a security credentials interface 312 and may receive one or more security credential from other wireless devices.

Although FIG. 3 illustrates one example of a wireless device 300 in a communication system, various changes may be made to FIG. 3. For example, any other suitable wireless device could receive and use security credentials from a card or other source. Also, the functional division shown in FIG. 3 is for illustration only. Various components in FIG. 3 could be combined, subdivided, or omitted and additional components could be added according to particular needs.

Figure 4:
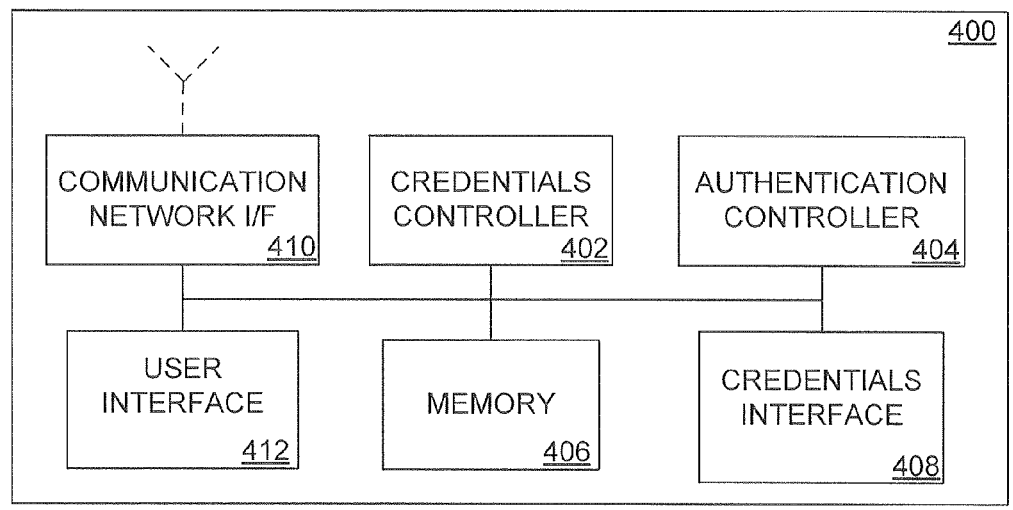
FIG. 4 illustrates an example trust center in a communication system according to this disclosure.

FIG. 4 illustrates an example trust center 400 in a communication system according to this disclosure. The trust center 400 could, for example, represent the trust center 108 in the communication system 100 of FIG. 1 or the trust center 216 in the industrial control and automation system 200 of FIG. 2. The embodiment of the trust center 400 shown in FIG. 4 is for illustration only. Other embodiments of the trust center 400 could be used in the systems 100 and 200 or in other systems without departing from the scope of this disclosure.

In this example, the trust center 400 includes a security credentials controller 402, an authentication controller 404, and a memory 406. The security credentials controller 402 controls the operation of the trust center 400 related to the generation and revocation of security credentials. For example, the security credentials controller 402 can generate security credentials, identify timer values, and store the security credentials on portable storage devices. The security credentials controller 402 could also detect removal of a portable storage device from a specified location (such as from a card reader/writer), initiate a timer, and control the revocation of the security credentials at the appropriate time. The security credentials controller 402 includes any hardware, software, firmware, or combination thereof for controlling the generation and distribution of security credentials.

The authentication controller 404 controls the authentication of communication devices attempting to access a wired or wireless network. For example, the authentication controller 404 could examine communications from a wireless device and determine whether the wireless device has appropriate security credentials. If so, the authentication controller 404 may signal nodes in a wireless network to allow the wireless device to communicate over the wireless network. If not, the authentication controller 404 can reject communications from the wireless device. The authentication controller 404 could use any suitable technique to authenticate a device or authorize a device to access a network. The authentication controller 404 includes any hardware, software, firmware, or combination thereof for authenticating or authorizing communication devices.

The memory 406 stores information used by various components in the trust center 400, such as the controllers 402-404. For example, the memory 406 could store security credentials generated by the controller 402 and used by the controller 404 to authenticate wireless devices. The memory 406 could store any other or additional information. The memory 406 includes any suitable volatile and/or non-volatile storage and retrieval device or devices.

The trust center 400 also includes a security credentials interface 408. The security credentials interface 408 represents an interface to a card or other portable storage device that can carry security credentials. The card or other device can be inserted into or otherwise communicatively coupled to the security credentials interface 408, which allows the controller 402 to provide the security credentials to the device. The security credentials interface 408 includes any suitable structure for interfacing the trust center 400 and a card or other device that can carry a security credential.

A communication network interface 410 facilitates communication between the trust center 400 and components in a communication network. For example, the communication network interface 410 may allow the trust center 400 to communicate with nodes forming a wireless network. Among other things, this may allow the trust center 400 to notify the nodes whether particular wireless devices are authenticated or authorized to use the wireless network. The communication network interface 410 may represent any suitable wired or wireless interface, and an antenna can be used when the communication network interface 410 represents a wireless interface (such as an RF transceiver).

A user interface 412 facilitates user interaction and control over the trust center 400. For example, the user interface 412 may present graphical displays to a user, which may allow the user to control the generation, distribution, and revocation of security credentials. The user interface 412 may also facilitate interaction with a display builder or other application that can be used to construct graphical displays, which can be made available to users of wireless devices. The user interface 412 could provide any other or additional functionality according to particular needs.

Although FIG. 4 illustrates one example of a trust center 400 in a communication system, various changes may be made to FIG. 4. For example, any other suitable trust center or other system or device could provide and control security credentials distributed to devices via cards or other portable storage devices. Also, the functional division shown in FIG. 4 is for illustration only. Various components in FIG. 4 could be combined, subdivided, or omitted and additional components could be added according to particular needs.

Figure 5:
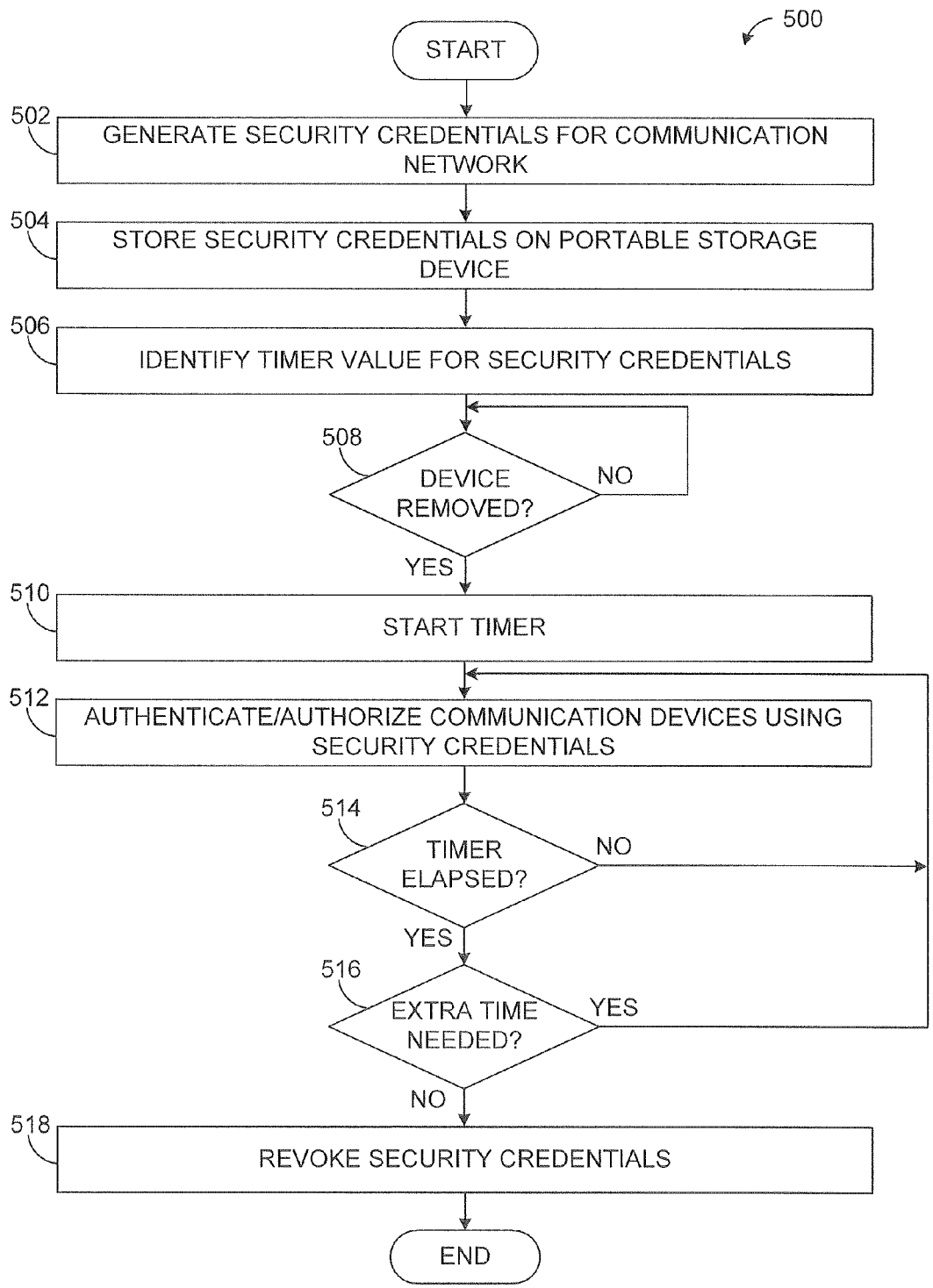
FIG. 5 illustrates an example method for distributing and controlling security credentials in a communication system according to this disclosure.

FIG. 5 illustrates an example method 500 for distributing and controlling security credentials in a communication system according to this disclosure. The embodiment of the method 500 shown in FIG. 5 is for illustration only. Other embodiments of the method 500 could be used without departing from the scope of this disclosure.

One or more security credentials for a communication network are generated at step 502. This could include, for example, the credentials controller 402 in the trust center 400 generating a cryptographic key or other security-related information. The information could be generated in any suitable manner using any suitable technique.

The one or more security credentials are stored on a portable storage device at step 504. This may include, for example, the trust center 400 storing the security credentials on a physical card 110 or 218 via the credentials interface 408. The portable storage device could represent any suitable device on which a security credential can be stored.

A timer value associated with the one or more security credentials is identified at step 506. This could include, for example, the trust center 400 identifying a predefined timer value for a specific security credential, for a specific type of security credential, for a specific plant or other facility, or any other suitable value.

If the portable storage device is removed at step 508, this may indicate that the one or more security credentials are required by first responders or other personnel. The removal of the portable storage device can be detected in any suitable manner, such as by generating an event when the portable storage device is removed from a card reader/writer. At this point, a timer is triggered or started at step 510, and one or more communication devices can be authenticated or authorized using the one or more security credentials at step 512. The timer could be set to the amount of time identified previously. Also, any suitable technique could be used to authenticate or authorize a communication device, such as by the authentication controller 404 determining whether a wireless device is using a proper encryption key, whether the wireless device has a proper MAC address, and whether the wireless device responds properly to a challenge. Once authenticated or authorized, the communication device can use a secured network.

The trust center determines if the timer has elapsed at step 514. If so, a determination can be made as to whether additional time is required at step 516. This could include, for example, prompting a user to input whether an emergency or other condition has been resolved. As another example, the trust center could be wired into or receive signals from an alarm system, and the trust center could determine whether additional time is required based on whether the alarm system is signaling that an emergency or other condition exists.

If additional time is required, the timer can be set to a specified amount of additional time and triggered. Otherwise, if the timer has expired and no additional time is required, the one or more security credentials are revoked at step 518. This may include, for example, the trust center indicating that the security credentials are no longer valid. This may also include the trust center notifying the nodes and other devices in a system of the revocation, which may allow the nodes and other devices to reject communications made using the revoked security credentials.

Although FIG. 5 illustrates one example of a method 500 for distributing and controlling security credentials in a communication system, various changes may be made to FIG. 5. For example, while shown as a series of steps, various steps in FIG. 5 could overlap, occur in parallel, occur in a different order, or occur multiple times. Also, the security credentials could be revoked at other times, such as when a user manually revokes the credentials or when the credentials are used in an improper way.

Figure 6:
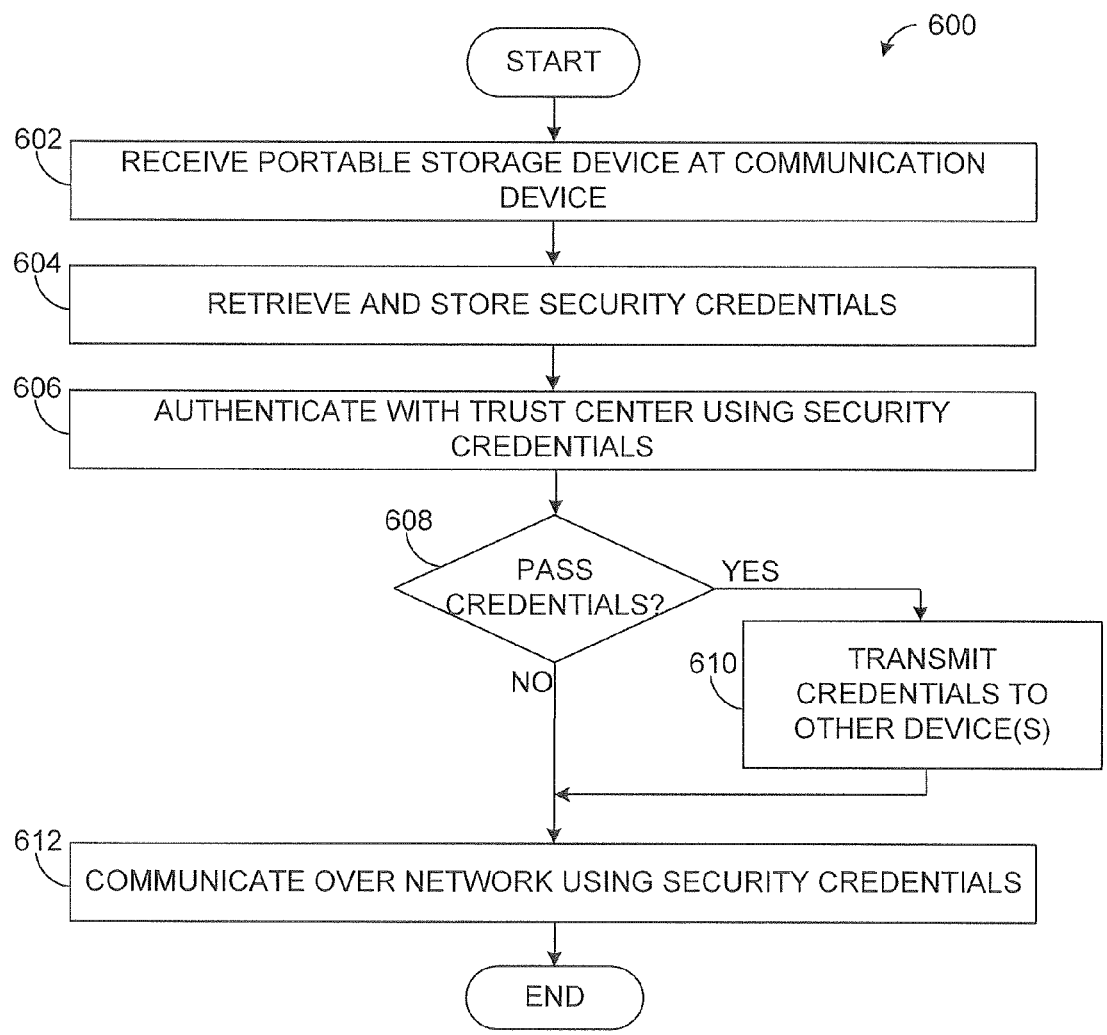
FIG. 6 illustrates an example method for receiving and using security credentials in a communication system according to this disclosure.

FIG. 6 illustrates an example method 600 for receiving and using security credentials in a communication system according to this disclosure. The embodiment of the method 600 shown in FIG. 6 is for illustration only. Other embodiments of the method 600 could be used without departing from the scope of this disclosure.

A portable storage device is received at a communication device at step 602. This may include, for example, a user inserting a portable storage device into a wireless device. As a particular example, this may include a first responder, such as a police officer, firefighter, or medic inserting a Compact Flash card, Secure Digital card, or other portable medium into a wireless communication device.

One or more security credentials are retrieved from the portable storage device at step 604. This may include, for example, the controller 308 in the wireless device storing a cryptographic key or other security-related information in the memory 310 of the device. The one or more security credentials are used to authenticate the device with a trust center at step 606. This may include, for example, the controller 308 using the cryptographic key or other security-related information retrieved from the portable storage device to communicate proper information to the trust center.

If the one or more security credentials need to be passed to other communication devices at step 608, the one or more security credentials are transmitted to the other communication devices at step 610. This may include, for example, the wireless device of a group leader transmitting the retrieved security credentials to the wireless devices of other group members. The transmissions may occur over secure channels to protect the security credentials.

The communication device communicates over a communication network using the one or more security credentials at step 612. This may include, for example, the wireless device communicating using the cryptographic key or other security-related information. The communications may occur over the wireless network until the wireless device stops communicating or the one or more security credentials are revoked, such as after a specific amount of time has elapsed.

Although FIG. 6 illustrates one example of a method 600 for receiving and using security credentials in a communication system, various changes may be made to FIG. 6. For example, while shown as a series of steps, various steps in FIG. 6 could overlap, occur in parallel, occur in a different order, or occur multiple times. Also, the security credentials could be received in other ways, such as when the security credentials are received wirelessly from another communication device that has retrieved the security credentials from a portable storage device.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    storing a security credential associated with a communication network on a portable storage device, the portable storage device configured to provide the security credential to at least one communication device, the security credential needed by the at least one communication device to access or use the communication network;
    detecting removal of the portable storage device from a specified location;
    in response to the removal of the portable storage device from the specified location, starting a timer and allowing the at least one communication device to communicate over the communication network after the at least one communication device has obtained the security credential; and
    revoking the security credential after a specified time period has elapsed as indicated by the timer;
    wherein allowing the at least one communication device to communicate over the communication network comprises at least one of: (i) authenticating the at least one communication device or (ii) authorizing the at least one communication device to communicate over the communication network.

2. The method of claim 1, wherein:
    the portable storage device comprises a card; and
    the specified location comprises a card reader/writer.

3. The method of claim 1, wherein revoking the security credential comprises revoking the security credential after the timer has expired.

4. The method of claim 1, further comprising determining whether additional time is needed;
    wherein revoking the security credential comprises revoking the security credential after the specified time period and an additional amount of time have elapsed.

5. The method of claim 1, wherein the at least one communication device is authenticated or authorized with a trust center using the security credential received by the at least one communication device from the portable storage device.

6. The method of claim 1, wherein authenticating the at least one communication device comprises using a wireless node to communicate with the at least one communication device, the wireless node separate from the communication network.

7. The method of claim 1, wherein:
    the communication network comprises a wireless network; and
    the security credential comprises a cryptographic key.

8. A system comprising:
    a communication network; and a trust center configured to:
  store a security credential associated with the communication network on a portable storage device, the portable storage device configured to provide the security credential to at least one communication device, the security credential needed by the at least one communication device to access or use the communication network;
  detect removal of the portable storage device from a specified location;
  in response to the removal of the portable storage device from the specified location, start a timer and allow the at least one communication device to communicate over the communication network after the at least one communication device has obtained the security credential; and
  revoke the security credential after a specified time period has elapsed as indicated by the time;
  wherein the trust center is configured to allow the at least one communication device to communicate over the communication network by at least one of: (i) authenticating the at least one communication device or (ii) authorizing the at least one communication device to communicate over the communication network.

9. The system of claim 8, wherein:
the portable storage device comprises a card; and
the specified location comprises a card reader/writer.

10. The system of claim 8, wherein the timer is configured to be set to an initial value and to be triggered upon the detection of the removal of the portable storage device from the specified location, the security credential revoked after the timer has expired.

11. The system of claim 8, wherein:
the trust center is further configured to determine whether additional time is needed; and
when additional time is needed, the trust center is configured to revoke the security credential after the specified time period and an additional amount of time have elapsed.

12. The system of claim 8, wherein the trust center is configured to authenticate the at least one communication device using a wireless node to communicate with the at least one communication device, the wireless node separate from the communication network.

13. The system of claim 8, wherein:
the communication network comprises a wireless network; and
the security credential comprises a cryptographic key.

14. The system of claim 8, further comprising a plurality of process sensors associated with an industrial control and automation system;
wherein the at least one communication device is configured to receive data from at least one of the sensors over the communication network.

15. The system of claim 14, wherein the at least one communication device is further configured to provide voice communications to a user.

16. The system of claim 8, wherein:
the trust center is configured to allow the at least one communication device to communicate over the communication network by using Medium Access Control (MAC) address/public key pairing; and
the trust center is configured to verify that communications from a particular communication device use an appropriate public key and that the particular communication device has an appropriate MAC address paired to that public key.

17. An apparatus comprising:
an interface configured to provide access to a portable storage device;
a security credentials controller configured to:
  generate a security credential associated with a communication network;
  store the security credential on the portable storage device, the portable storage device configured to provide the security credential to at least one communication device, the security credential needed by the at least one communication device to access or use the communication network;
  detect removal of the portable storage device from a specified location;
  start a timer in response to the removal of the portable storage device from the specified location; and
  revoke the security credential after a specified time period has elapsed as indicated by the timer; and
an authentication controller configured to allow, in response to the removal of the portable storage device from a specified location, the at least one communication device to communicate over the communication network after the at least one communication device has obtained the security credential when the security credential is valid, the authentication controller configured to at least one of: (i) authenticate the at least one communication device or (ii) authorize the at least one communication device to communicate over the communication network.

18. The apparatus of claim 17, wherein:
the portable storage device comprises a card; and
the specified location comprises a card reader/writer.

19. The apparatus of claim 18, wherein the security credentials controller is configured to detect the removal of the portable storage device from the specified location by detecting an event generated in response to the card being removed from the card reader/writer.

20. The apparatus of claim 17, wherein:
the communication network comprises a wireless network; and
the security credential comprises a cryptographic key.

* * * * *